(12) United States Patent
Kim

(10) Patent No.: US 7,119,290 B2
(45) Date of Patent: Oct. 10, 2006

(54) MULTI-FUNCTIONAL REMOTE CONTROL SWITCH ON STEERING WHEEL

(75) Inventor: Dong-Woo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/151,787

(22) Filed: Jun. 14, 2005

(65) Prior Publication Data

US 2005/0274591 A1 Dec. 15, 2005

(30) Foreign Application Priority Data

Jun. 15, 2004 (KR) ...................... 10-2004-0044031

(51) Int. Cl.
*H01H 9/00* (2006.01)
(52) U.S. Cl. ............................ 200/5 R; 200/4; 200/14; 200/61.54
(58) Field of Classification Search ................ 200/4, 200/5 R, 6 A, 14, 17 R, 18, 61.54; 341/35; 345/156, 157, 161, 184
See application file for complete search history.

(56) References Cited

U.S. PATENT DOCUMENTS

| 6,340,800 | B1 * | 1/2002 | Zhai et al. .................. 200/5 R |
| 6,410,866 | B1 * | 6/2002 | Klein et al. ................. 200/5 R |
| 6,479,769 | B1 * | 11/2002 | Barat et al. ................. 200/5 R |
| 6,636,200 | B1 * | 10/2003 | Kataoka et al. ............. 345/161 |
| 6,903,288 | B1 * | 6/2005 | Varga ......................... 200/5 R |

\* cited by examiner

*Primary Examiner*—Michael A. Friedhofer
(74) *Attorney, Agent, or Firm*—Morgan Lewis & Bockius LLP

(57) ABSTRACT

A multi-functional remote control switch on a steering wheel includes a housing installed at the steering wheel. A printed circuit board is secured in the housing and formed with a plurality of manipulation switches and switch circuits. A dial is rotatably installed between the housing and printed circuit board. A switching device outputs a manipulation signal of the manipulation switches to a system selected by turning the dial. This switch manipulates various systems of the vehicle by using one remote control switch mounted on the steering wheel, thereby reducing the cost of materials and obtaining a sufficient installment space.

11 Claims, 5 Drawing Sheets

MULTI-FUNCTIONAL REMOTE CONTROL SWITCH ON STEERING WHEEL

CROSS-REFERENCE TO RELATED APPLICATIONS

The present application is based on, and claims priority from, Korean Application Serial Number 10-2004-0044031, filed on Jun. 15, 2004, the disclosure of which is hereby incorporated by reference herein in its entirety.

FIELD OF THE INVENTION

The present invention relates to a multi-functional remote control switch mounted on a steering wheel for activation and control of various systems in a vehicle.

BACKGROUND OF THE INVENTION

Nowadays, the number switches for controlling various devices and electronic systems in automobiles have greatly increased. However, space for installing such switches has been limited inside the vehicle. There is therefore a need in the art for more efficient switching devices.

SUMMARY OF THE INVENTION

Embodiments of the present invention are provided to manipulate various systems of a vehicle by using a remote control switch mounted on the steering wheel, thereby minimizing the cost of materials and obtaining sufficient space for installation.

A multi-functional remote control switch on a steering wheel includes a housing installed at the steering wheel. A printed circuit board is secured in the housing and formed with a plurality of manipulation switches and switch circuits. A dial is rotatably installed between the housing and printed circuit board. A switching means outputs a manipulation signal of the manipulation switches to a system selected by turning the dial.

The switching means includes a first switch manipulation signal outputting contact point formed at the bottom of the printed circuit board. A first grounding contact point is also formed at the bottom of the printed circuit board. A plurality of second switch manipulation signal outputting contact points are distantly formed along a circumferential direction on the upper surface of the dial to selectively contact the first switch manipulation signal outputting contact point according to the rotation of the dial. A second grounding contact point is formed on the upper surface of the dial to contact the first grounding contact point.

The second grounding contact point is formed along the circumferential direction to retain a contact state with the first grounding contact point even if the dial turns.

The printed circuit board is further installed at the upper portion thereof with a cover, and a fixing protrusion of the cover penetrates a hole formed at the printed circuit board and thus a hitching jaw formed at the front tip of the fixing protrusion is inserted and fixed to the housing.

The cover is further formed with a guiding protrusion, and the fixing protrusion and guiding protrusion are inserted into a hole formed at the middle of the dial to serve as a central shaft during the rotation of the dial.

The cover includes a first cover enclosing a plurality of manipulating switches disposed along a circumferential direction on the printed circuit board. A second cover encloses a manipulation switch disposed in the middle of the printed circuit board.

The second cover is formed at one end thereof with a fixing protrusion having a hitching jaw, and the fixing protrusion is inserted into a hole formed at the first cover.

The interior of the first cover and second cover is further formed with pressing protrusions to press the manipulation switches.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
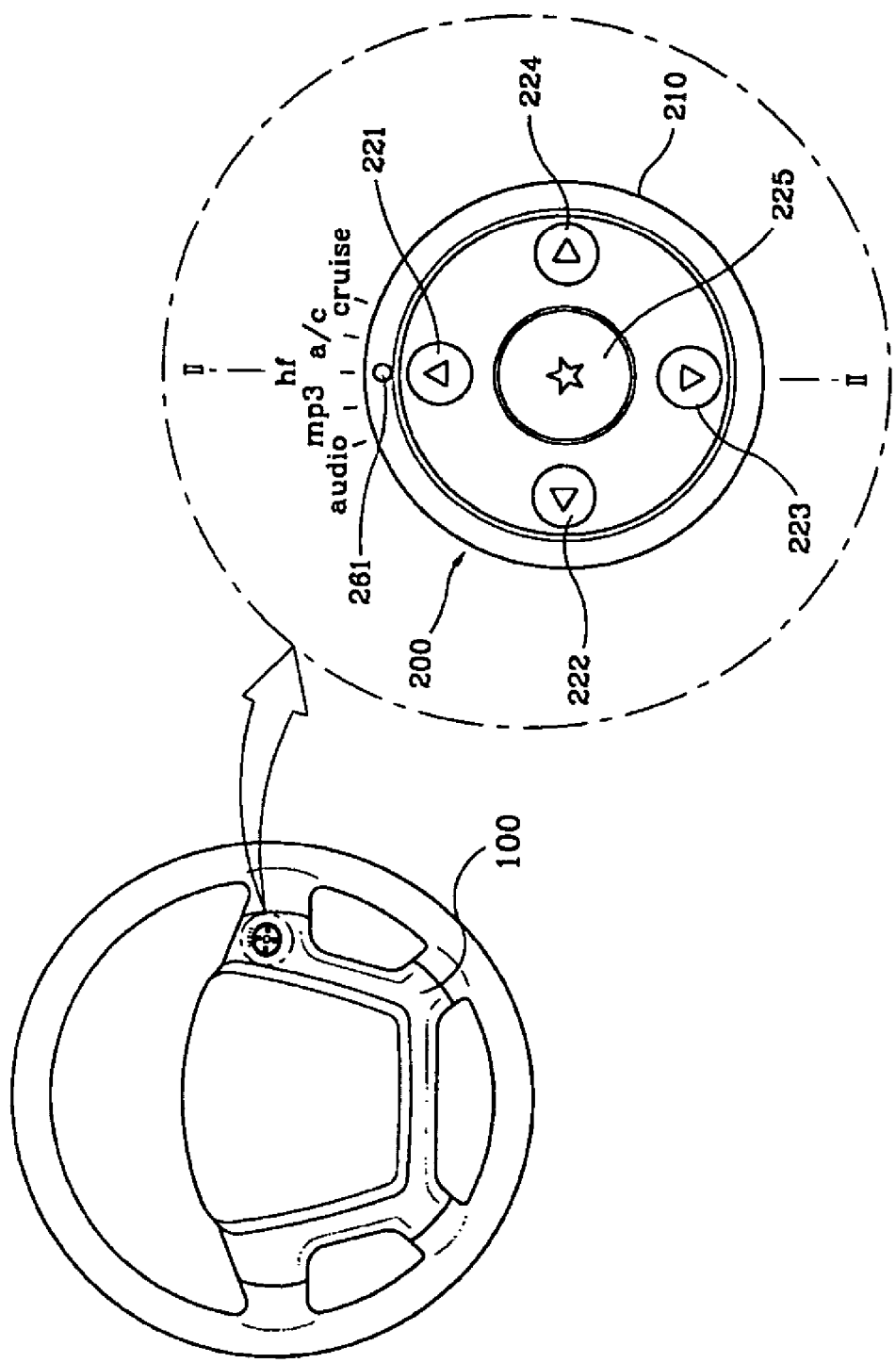
FIG. 1 illustrates a multi-functional remote control switch according to an embodiment of the present invention.
Figure 2:
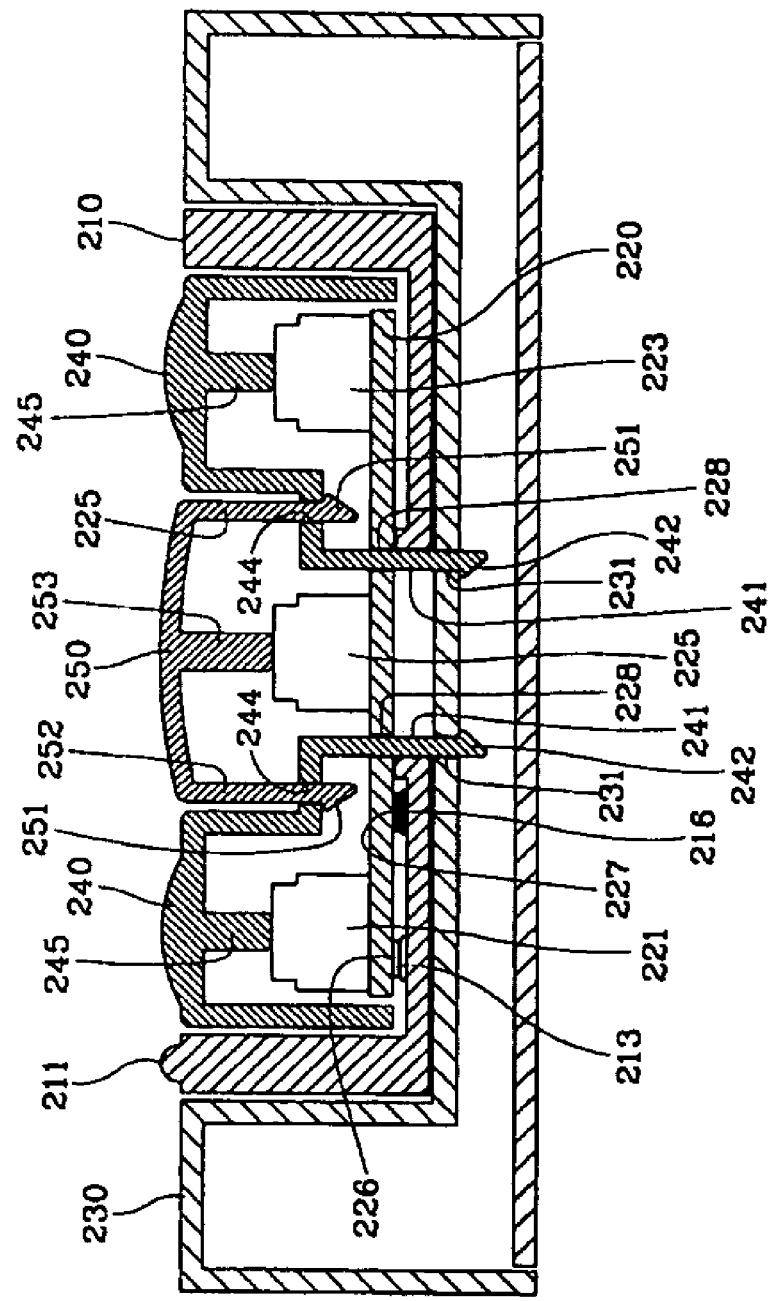
FIG. 2 is a cross-sectional view taken along line II—II of the multi-functional remote control switch of FIG. 1.
Figure 3:
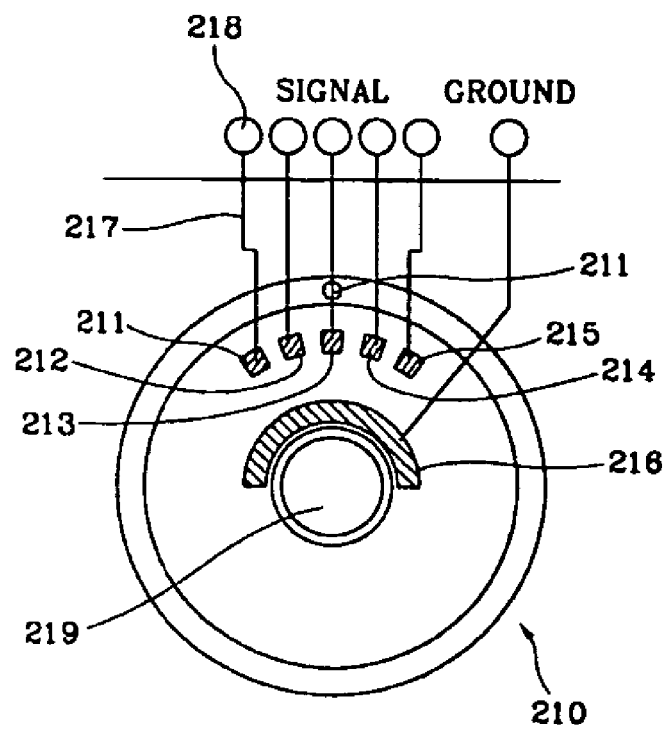
FIG. 3 is a top view of a dial of a multi-functional remote control switch according to an embodiment of the present invention.
Figure 4:
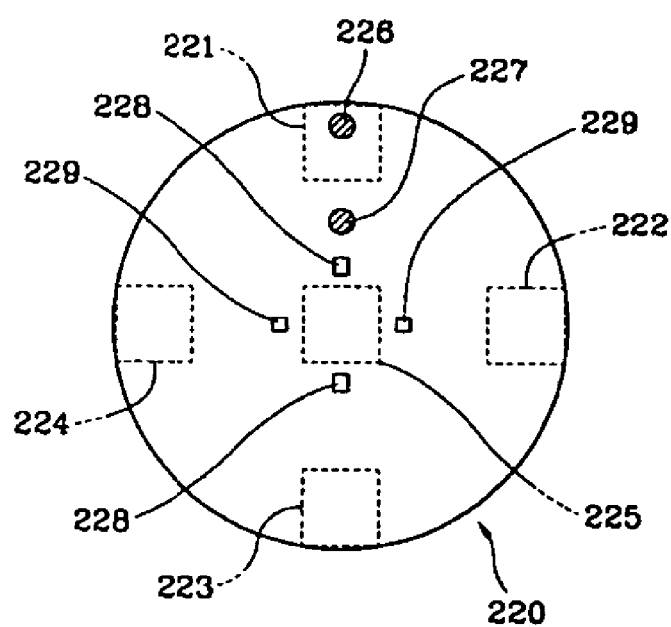
FIG. 4 is a bottom view of a printed circuit board of a multi-functional remote control switch according to an embodiment of the present invention.
Figure 5:
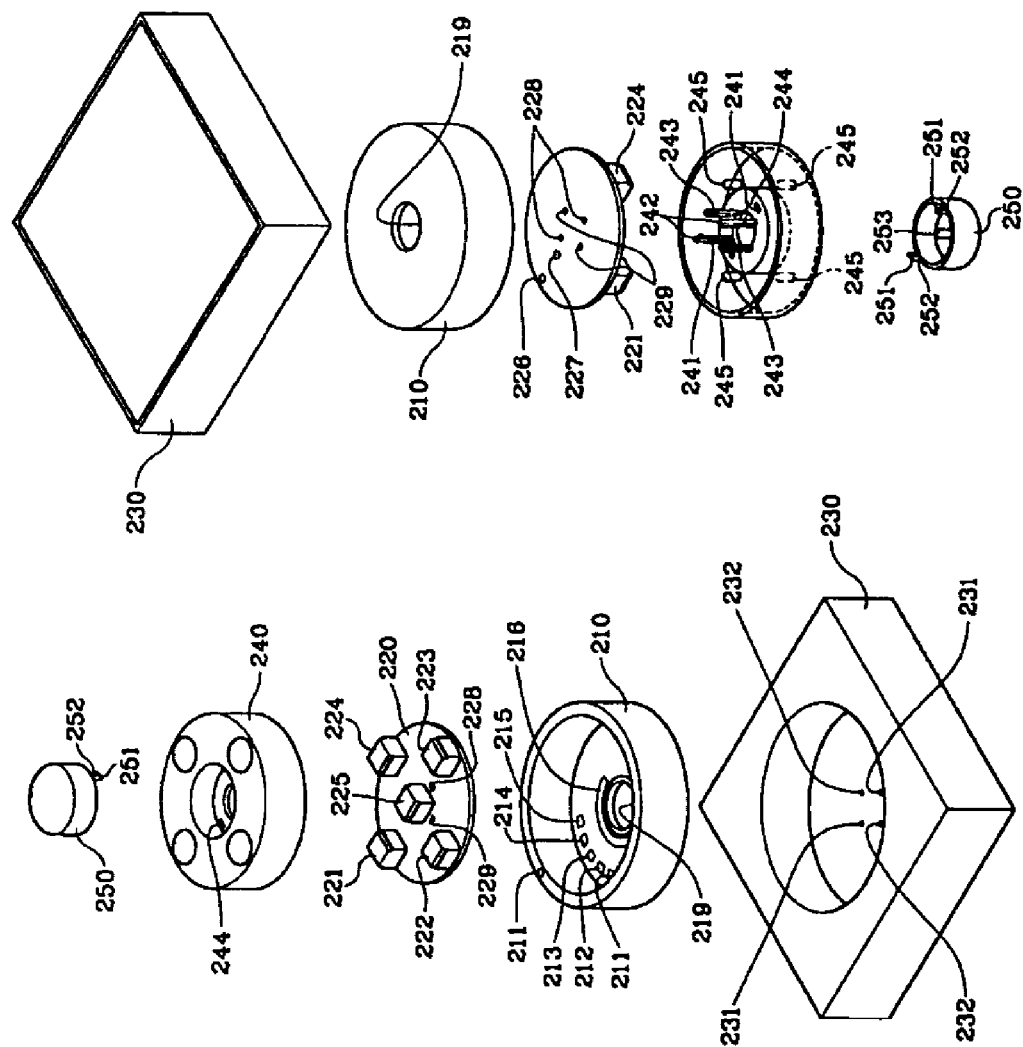
FIG. 5 is a disassembled perspective view of a multi-functional remote control switch according to an embodiment of the present invention.

As illustrated in FIG. 1, a multi-functional remote control switch 200 according to an embodiment of the present invention is installed on a steering wheel 100 of a vehicle. A dial 210 of multi-functional remote control switch 200 can select any one of an audio player, MP3 player, hands-free system, air conditioner, or cruise control. Each manipulation switch 221, 222, 223, 224, and 225 mounted in dial 210 outputs a manipulation signal to a system selected by dial 210. Dial 210 is formed with an indicative protrusion 261 to notify the user of the present selected system. The upper surface of dial 210 is preferably unevenly formed to allow the user to easily rotate dial 210.

Figure 6:
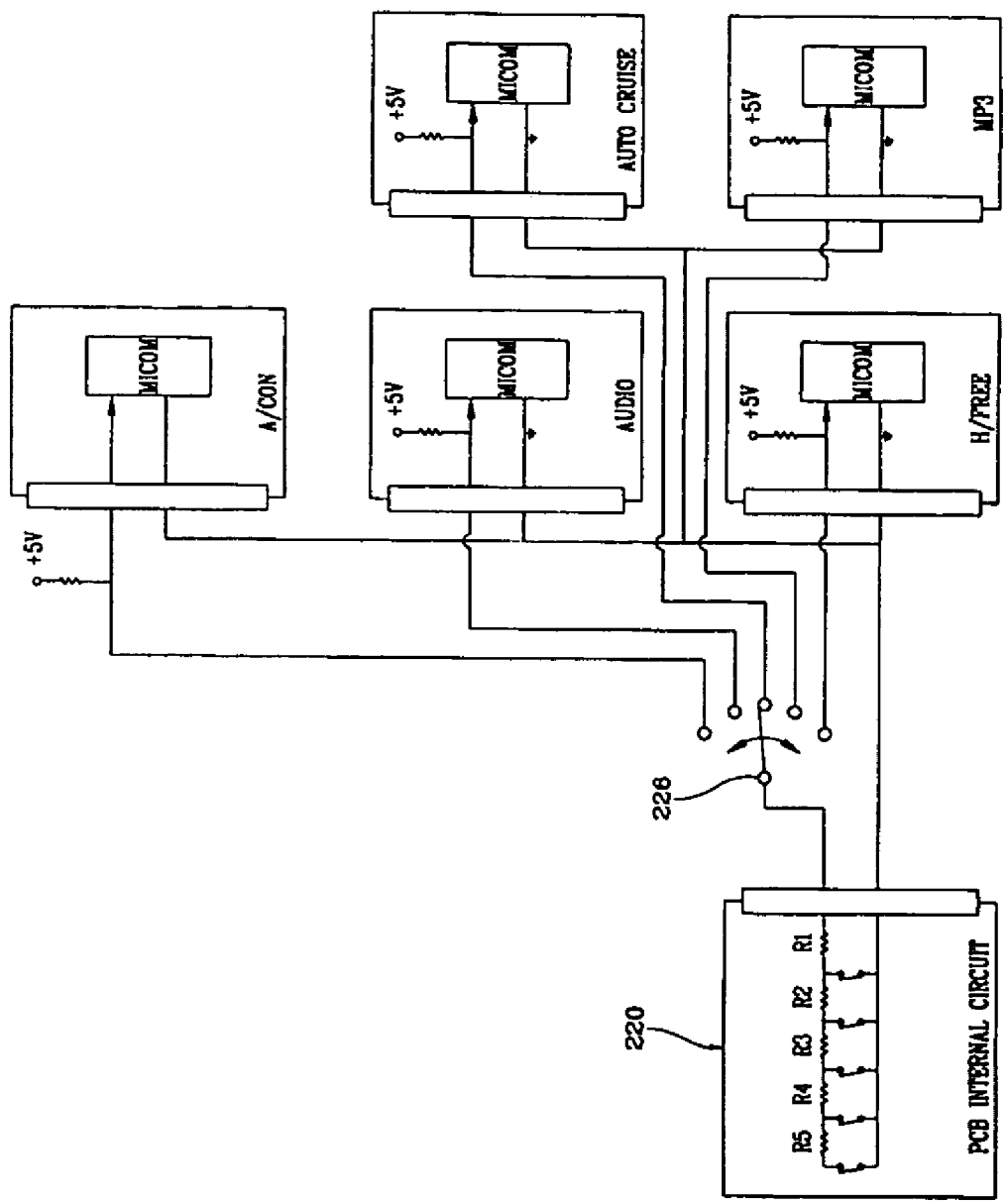
FIG. 6 is a circuit diagram of a multi-functional remote control switch according to an embodiment of the present invention.

Referring to FIGS. 2 to 5, a housing 230 installed at the steering wheel is secured therein with a printed circuit board 220 formed with a plurality of manipulation switches 221–225 and switch circuits. Manipulation switches 221–225 are tactile switches and the switch circuits are constituted by a plurality of switches (SW1–SW5; 221–225) and resistances (R1–R5) (see FIG. 6). The embodiment of the present invention is executed in a voltage distribution method in which the voltage value applied to each system (e.g., audio player, MP3 player, hands-free system, air conditioner, cruise control, and the like) varies according to the manipulated switch.

Dial 210 is rotatably disposed between printed circuit board 220 and housing 230. Manipulation switches 221–225 output their manipulation signals to a system selected by turning dial 210, wherein the signal is outputted via a switching means embodied by a plurality of contact points of dial 210 and printed circuit board 220.

Printed circuit board 220 is formed at the bottom thereof with a first switch manipulation signal outputting contact point 226 and first grounding contact point 227, and dial 210 is formed at the upper surface thereof with a plurality of second switch manipulation signal outputting contact points 211, 212, 213, 214, 215 and a second grounding contact point 216.

The plurality of second switch manipulation signal outputting contact points 211–215 are distantly formed from each other along the circumferential direction on the upper surface of dial 210 to thereby selectively contact first switch manipulation signal outputting contact point 226 as dial 210 turns. Second switch manipulation signal outputting contact points 211–215 are coupled via flexible wires 217 to terminals 218 connected to each system.

Second grounding contact point 216 is formed along the circumferential direction of dial 210 to retain the contact state with first grounding contact point 227 even if dial 210 is turned. Second grounding contact point 216 is linked via a flexible wire to a terminal connected to a ground.

The upper portion of printed circuit board 220 is equipped with a first and second cover 240 and 250, and fixing protrusions 241 of first cover 240 penetrate holes 228 formed at printed circuit board 220, thus hitching jaws 242 formed at the front tip of fixing protrusions 241 are inserted and fixed to holes 231 of housing 230.

First cover 240 is formed with guiding protrusions 243 that are inserted into holes 232 of housing 230 through holes 229 formed at printed circuit board 220.

Fixing protrusions 241 and guiding protrusions 243 are inserted into a hole 219 formed at the middle of dial 210 and serve as a central shaft during the rotation of dial 210.

First cover 240 encloses the plurality of manipulation switches 221–224 disposed along the circumferential direction on printed circuit board 220. Second cover 250 encloses manipulation switch 225 located in the middle of printed circuit board 220.

Second cover 250 is formed with fixing protrusions 252 having at the front tip thereof hitching jaws 251. Fixing protrusions 252 are inserted into holes 244 of first cover 240.

The interior of first cover 240 and second cover 250 is also formed with pressing protrusions 245 and 253 to press manipulation switches 221–225.

The operation and effect of the multi-functional remote control switch on the steering wheel will now be described.

The user selects any one mode from audio player, MP3 player, hands-free system, air conditioner, or cruise control by manipulating dial 210 of the multi-functional remote control switch 200 located on steering wheel 100. The system selected via dial 210 can be controlled by maneuvering manipulation switches 221–225 mounted in dial 210.

As described in the above Embodiment 1, if the user selects the hands-free system mode, each manipulation switch 221–225 on printed circuit board 220 functions as a manipulation button for call/off, secret call, mode conversion, volume up and volume down.

For the audio player mode, each manipulation switch 221–225 on printed circuit board 220 functions as a manipulation button of mode, search –, search +, volume up and volume down.

The controllable systems by the remote control switch are not limited to the examples of the embodiment of present invention, i.e., audio player, MP3 player, hands-free system, air conditioner and cruise control.

As apparent from the foregoing, there is an advantage in that a plurality of systems of a vehicle can be manipulated by one remote control switch equipped on the steering wheel, resulting in a reduction of the cost of materials and obtainment of a sufficient installment space.

What is claimed is:

1. A multi-functional remote control switch, comprising:
   a housing;
   a printed circuit board secured in said housing and formed with a plurality of manipulation switches and switch circuits;
   a dial rotatably installed between said housing and said printed circuit board; and
   switching means for outputting a manipulation signal of said manipulation switches to a system selected by turning said dial.

2. The switch as defined in claim 1, wherein said housing is configured and dimensioned for mounting on a vehicle steering wheel.

3. The switch as defined in claim 1, wherein said switching means includes:
   a first switch manipulation signal outputting contact point formed at a bottom of said printed circuit board;
   a first grounding contact point formed at a bottom of said printed circuit board;
   a plurality of second switch manipulation signal outputting contact points that are distantly formed along a circumferential direction on an upper surface of said dial to selectively contact said first switch manipulation signal outputting contact point according to a rotation of said dial; and
   a second grounding contact point formed on an upper surface of said dial to contact said first grounding contact point.

4. The switch as defined in claim 3, wherein said second grounding contact point is formed along said circumferential direction to retain a contact state with said first grounding contact point even if said dial turns.

<Embodiment I>

| Function | Mode | | | | |
| --- | --- | --- | --- | --- | --- |
| | Audio player | MP3 player | Hands-free system | Air conditioner | Cruise control |
| ★ | mode | select | call/off | on/off | on/off |
| ◄ | search – | search – | secret call | airflow ↓ | cancel |
| ► | search + | search + | mode conversion | airflow ↑ | reset |
| ▲ | volume up | superior directory | volume up | temperature + | speed up |
| ▼ | volume down | inferior directory | volume down | temperature – | speed down |

5. The switch as defined in claim 1, wherein said printed circuit board is further installed at an upper portion thereof with a cover, and a fixing protrusion of said cover penetrates a hole formed at said printed circuit board and thus a hitching jaw formed at a front tip of said fixing protrusion is inserted and fixed to said housing.

6. The switch as defined in claim 5, wherein said cover is further formed with a guiding protrusion, and said fixing protrusion and said guiding protrusion are inserted into a hole formed in the middle of said dial to function as a central shaft during rotation of said dial.

7. The switch as defined in claim 5, wherein said cover includes:
- a first cover enclosing a plurality of manipulating switches disposed along a circumferential direction on said printed circuit board; and
- a second cover enclosing a manipulation switch disposed in the middle of said printed circuit board.

8. The switch as defined in claim 7, wherein said second cover is formed at one end thereof with a fixing protrusion having a hitching jaw, and said fixing protrusion is inserted into a hole of said first cover.

9. The switch as defined in claim 7, wherein an interior of said first cover and second cover is further formed with pressing protrusions to press said manipulation switches.

10. A multi-functional remote control switch, comprising:
- a housing;
- a printed circuit board secured in said housing and formed with a plurality of manipulation switches and switch circuits;
- a dial rotatably installed between said housing and said printed circuit board; and
- a first switch manipulation signal outputting contact point formed at a bottom of said printed circuit board;
- a first grounding contact point formed at a bottom of said printed circuit board;
- a plurality of second switch manipulation signal outputting contact points that are distantly formed along a circumferential direction on an upper surface of said dial to selectively contact said first switch manipulation signal outputting contact point according to a rotation of said dial; and
- a second grounding contact point formed on an upper surface of said dial to contact said first grounding contact point.

11. The switch as defined in claim 10, wherein said housing is configured and dimensioned for mounting on a vehicle steering wheel.

* * * * *